United States Patent [19]

Mendelsohn et al.

[11] Patent Number: 5,422,380
[45] Date of Patent: Jun. 6, 1995

[54] SOUND ABSORBING AND DECOUPLING SYNTACTIC FOAM

[75] Inventors: Morris A. Mendelsohn, Wilkins Twp., Allegheny County, Pa.; Richard Bolton, Saratoga, Calif.; Francis W. Navish, Jr., East Pittsburgh, Pa.

[73] Assignee: Westinghouse Electric Corporation, Pittsburgh, Pa.

[21] Appl. No.: 255,859

[22] Filed: Jun. 7, 1994

[51] Int. Cl.$^6$ ............................................. C08G 18/00
[52] U.S. Cl. ..................................... 521/107; 521/137; 521/159; 521/163; 521/164; 521/170; 521/172; 521/174
[58] Field of Search ............... 521/107, 137, 159, 163, 521/164, 170, 172, 174

[56] References Cited

U.S. PATENT DOCUMENTS

| | | | |
|---|---|---|---|
| 3,634,562 | 1/1972 | Kole et al. | 264/41 |
| 4,303,729 | 12/1981 | Torobin | 428/327 |
| 4,485,719 | 12/1984 | Mendelsohn et al. | 89/1.816 |
| 4,604,940 | 8/1986 | Mendelsohn et al. | 89/1.816 |
| 4,739,027 | 4/1988 | Mendelsohn et al. | 528/68 |
| 4,782,097 | 11/1988 | Jain et al. | 521/56 |
| 4,843,104 | 1/1989 | Melber et al. | 521/54 |
| 5,114,982 | 5/1992 | Mendelsohn et al. | 521/59 |

OTHER PUBLICATIONS

Brooks and Rey, Polystyrene-Urethane Composite Foam for Carsh Padding Applications, Journal of Cellular Plastics, p. 232 (Sep./Oct. 1973).

Hinselmann and Stabenow, Zur Entstehung der Zellstruktur von Polystyrolschaum, VDI-Berichte p. 165 (Nr. 182, 1972) with translation.

Encyclopedia of Polymer Science and Engineering vol. 3 (John Wiley & Sons, Inc. 1985).

*Primary Examiner*—Maurice J. Welsh

[57] ABSTRACT

There is disclosed a sound-absorbing syntactic foam comprising expanded polystyrene microspheres, dispersed randomly in a polyurethane matrix.

82 Claims, 4 Drawing Sheets

SOUND ABSORBING AND DECOUPLING SYNTACTIC FOAM

BACKGROUND OF THE INVENTION

1. Field of the Invention

The present invention is directed to cellular materials. More specifically, the invention relates to syntactic foams comprising a polyurethane matrix resin and hollow polymeric microspheres, and the processes for making and using the same. The foams of the invention have utility as sound absorbing and decoupling agents.

2. Description of the Prior Art

The compositions of the invention are cellular materials that have been specially tailored to have sound absorbing properties suitable for muffling the sounds emitted by various underwater vehicles and surface ships and vehicles and to have acoustic scattering and decoupling properties so as to present an anechoic response when impacted by sound from an external source. More specifically, the compositions of the invention are syntactic foams prepared from a three-dimensional flexible or semi flexible polyurethane matrix and hollow polymeric microspheres having polystyrene shells.

Cellular materials, of which foams are an example, may generally be defined as two-phase gas-solid systems wherein the solid phase exists as a continuous matrix and the gas-phase occupies pockets dispersed throughout the matrix. The pockets, also known as cells or voids, may be discrete such that the gas phase within each cell is independent of that present in other cells. Cellular materials having discrete cells are denoted closed-cell foams. Alternatively, the cells may be partially or largely interconnected, in which case the system is termed an open-celled foam. Another type of classification of cellular materials is based on the bulk properties of the foam. A flexible foam, according to ASTM Test D 1566-82 (Definitions of Terms Related to Rubber, Vol. 37, ASTM, Philadelphia, Pa., 1982) is one that will not rupture when a 20×2.5×2.5 cm piece is wrapped around a 2.5 cm mandrel at a specified rate. In contrast, a rigid foam will rupture when subjected to the same conditions.

Yet another means to distinguish foams concerns the method of their manufacture. The most widely used methods involve dispersion of a gaseous phase throughout a fluid polymer phase and the preservation of the resultant foamed state as the gas expands while the fluid polymer precursor solidifies. In most foams, the expansion process consists of three steps. First is the creation of small gas bubbles in the fluid matrix. Next, these bubbles are expanded to a desired volume. Concurrently, the bubble filled fluid matrix is stabilized by conversion to a solid form through its polymerization.

In the case of thermoplastic foams, solidification of the melted matrix polymer results through cooling. Such foams are, however, not suitable for our application because they exhibit inadequate dimensional stability, do not possess the desired physical properties and cannot be cast in place. Cast in place directly onto a substrate, even of a highly irregular shape, provides essentially a perfect fit which cannot be achieved with a preshaped thermoplastic article. Furthermore, the highly undesirable use of adhesives is avoided using a cast in place system.

The creation of the small bubbles in the fluid matrix can be achieved through a variety of means. One common method of obtaining a blown foam is to incorporate a low boiling liquid into the fluid polymer precursor or prepolymer phase, or into fluid reactants and then vaporize the liquid blowing agent by increasing the temperature of the system or decreasing the ambient pressure. Concurrently, the fluid matrix solidifies entrapping the bubbles. An alternative method adds a chemical blowing agent to the fluid polymer precursor or prepolymer phase which decomposes and forms a gas upon heating. The concurrently solidifying matrix traps the gas bubbles. Another method which is popularly employed involves conversion of the fluid matrix to a solid form while a gaseous byproduct is being formed. Such is the case when polyisocyanates are reacted with polyhydric organic compounds and water to produce polyurethanes and carbon dioxide. In this case, the gaseous byproduct, carbon dioxide, is harnessed to produce the voids in the foam.

While polyurethane foams are commonly produced using byproduct carbon dioxide as the bubble forming agent, this technique and the other previously mentioned techniques are fraught with many practical difficulties when preparing a foam having the special cellular characteristics that we require. For example, the ambient conditions of temperature, pressure and humidity must be carefully monitored and controlled in order to control the rate and size of bubble formation. Other important parameters which must be considered include processing methodology such as the nature of the foam machine, type of mixing, mixing pressure, etc. and factors such as the smoothness of the surfaces to which the forming foam is contacted, and the surface characteristics of filler particles. Rough, irregular surfaces will tend to promote bubble formation. The presence of dissolved gases, such as air, in the polyurethane precursors will also contribute to bubble formation and so their potential contribution must be considered when developing reaction conditions. Unless the reaction and processing conditions are carefully monitored and controlled, the resulting foam may have undesirable cell volumes and/or cell volume distributions. One may also obtain open cells or a mixture of open and closed cells, as opposed to essentially all closed cells, which are required in our application. In the previously above described types of foams, the cell size distributions may be undesirable; however, in a syntactic foam the size of the added hollow particles may be controlled. Finally, in a blown foam, the cell shape may be elongated due to the anisotropic forces within the expansion process; whereas, the desired essentially spherical type symmetry is obtained for the hollow polystyrene spheres. The characteristics of the cells are very important because they significantly effect the structural, acoustic, thermal, and electrical properties of the foam.

In our application, we require closed-cell foams. Open-cell foams can fill with water when submerged for extended periods of time, especially at the high hydrostatic pressures that correspond to great depths. Except for syntactic foams, flexible polyurethane foams contain open or interconnected cells. Although rigid polyurethane foams are comprised primarily of closed cells, they cannot be used. Since they do not possess the desired acoustic characteristics, they undergo brittle fracture on slight to moderate impacts and undergo excessive irreversible compression sets or crushing when exposed to high compressive loadings.

The type of syntactic foams employed in this invention, use a flexible matrix polymer which possess the desired viscoelastic and other mechanical characteristics and also provides the desired isotropy.

One means to overcome some of the difficulties in controlling the size, shape and non-connectivity of the cells in a foam is to disperse microspheres in the fluid polymer precursor matrix. The product is known as a syntactic foam. The microspheres employed herein, are hollow spheres whose surface or wall structure has sufficient modulus so that the basic shape of the sphere will be retained in the finished foam. It is also known to make the sphere surfaces from phenolic resins, vinylidene chloride based polymers, urea-formaldehyde resin, glass or silica. It is also known to disperse these microspheres in epoxy resins, polyesters, and urea-formaldehyde based polymers. See Encyclopedia of Polymer Science, Cellular Materials, Volume 3, page 31, (John Wiley & Sons, Inc., 1985).

In the preparation of the syntactic polyurethane one may employ either unexpanded microspheres, which are subsequently expanded during processing, or pre-expanded (already expanded) spheres. The former has the advantage of greater ease of incorporating the spheres into the matrix resin; whereas the latter provides for more precise control of the ultimate density of the polyurethane syntactic foam.

Instead of consisting of simple single-cell hollow (or gas-filled) spheres, as are those mentioned above, the individual polystyrene microspheres have inner hollow (gas-filled) cells which may number as many as 10,000 cells or voids per cubic millimeter. See reference K. Hinselman and Dr. J. Stabenow: "Zur Entstehung der Zellstruktur von Polystyrolschaum", Verein Deutscher Ingeniure, Berichte Nr. 182 pgs. 165-170, 1972. In a different type of application, J. D. Brooks and L. G. Rey: "Polystyrene-Urethane Composite Foam for Crash Padding Applications", pgs 233-235 in Journal of CELLULAR PLASTICS, September/October, 1973 involving crash padding, polystyrene beads are mixed into a polyurethane foam. Thus, in this reference, there are two types of voids present-those from the polyurethane foam and those from the expanded polystyrene beads. The semirigid composite foam that resulted had originated from a polyurethane foam that had to be flexible or at least semi-flexible. Such polyurethane foams are invariably open-celled which cannot be tolerated in undersea acoustic applications. Furthermore, the high set value of the composite foam on compressive loading (see FIG. 5 of the reference) also precludes its use in our type of application. In addition, the anisotropy of the cells of the polyurethane foam component also renders this type of material as unacceptable.

SUMMARY OF THE INVENTION

It has been found that a sound absorbing and decoupling agent can be prepared by dispersing polystyrene microspheres throughout a three-dimensional polyurethane matrix. Methods for preparing the syntactic foam matrix of the invention include readily controllable one-step and two-step reaction processes. The synthetic methods afford wide latitude in terms of techniques by which the foam may be applied to the substrate.

The sound-absorbing syntactic foam according to present invention comprises expanded polystyrene microspheres, dispersed randomly in a polyurethane matrix.

DETAILED DESCRIPTION OF THE INVENTION

The present invention is directed to syntactic foams having sound absorbing and decoupling properties. The syntactic foams of the invention comprise a three-dimensional polyurethane matrix throughout which is dispersed hollow microspheres having polymeric and in particular polystyrene shells.

The syntactic foams of the invention incorporate a three-dimensional polyurethane network. The principal urethane forming reaction occurs between an isocyanate and an alcohol. The use of difunctional isocyanates and difunctional alcohols results in the generation of essentially linear polyurethanes. In order to provide superior performance as a foam matrix, the polyurethane needs to have a three-dimensional or crosslinked structure. This can be readily accomplished by employing at least one reactive partner that contains three or more reactive groups in the molecule. It is also well known in the art that amines react with isocyanate groups, and that polyamines and polyisocyanates can also react to form three dimensional networks.

In the practice of this invention, the three dimensional polyurethane and also polyurea foam matrices are prepared from the reaction of one or more polyisocyanates with one or more polyfunctional active hydrogen species. The polyisocyanate comprises molecules having two or more isocyanate groups per molecule. The polyfunctional active hydrogen species comprise molecules having two or more hydroxyl groups, which can be primary or secondary or of the phenolic type, or two or more primary or secondary amino (or amine) groups. The amino groups may be of an aliphatic or aromatic type. Polyfunctional active hydrogen compounds may also utilize molecules which contain both amino and hydroxyl groups. The term active hydroxyl polyfunctional compound or active amine polyfunctional compound refers to hydroxyl or amino containing compounds, respectively.

In the absence of a polyamine or polyol having a functionality of greater than two, a polyisocyanate having a functionality greater than two may be employed to give a three dimensional network (crosslinks). In cases where no compound having a functionality greater than two is employed, an excess of diisocyanate can provide a three dimensional network through allophanate and/or biuret crosslinks.

The Polyisocyanate

The polyisocyanates of the invention are aliphatic or aromatic compounds having two or more isocyanate groups.

There are significant differences between aromatic polyisocyanate monomers and aliphatic polyisocyanate monomers. For purposes of the invention, the most important difference to recognize is that the aromatic isocyanate groups are considerably more reactive with both hydroxyl and amine groups than are the aliphatic isocyanate groups. This difference in reactivity means that aromatic polyisocyanates will react to form a solid polymer more rapidly, all other factors being equal, than will aliphatic polyisocyanates. Thus, catalysts are frequently used with the aliphatic polyisocyanates.

Suitable aromatic diisocyanates contain 6 to about 25 carbon atoms (excepting the carbon atoms in the isocyanate groups). Representative difunctional aromatic polyisocyanates include, but are not limited to, the positional isomers of toluene diisocyanate (TDI) including toluene-2,4-diisocyanate, toluene-2,6-diisocyanate the positional isomers of $\alpha,\alpha,\alpha',\alpha'$-tetramethyl-xylylene diisocyanate (TMXDI) including the meta and para isomers, the positional isomers of phenylene diisocyanates including the meta and para (PPDI) isomers, 4,4'-methylene-bis(phenylisocyanate) also know as diphenylmethane-4,4'-diisocyanate (4,4'-MDI or as MDI), diphenylmethane-2,4-diisocyanate (2,4'-MDI), naphthalene-1,5-diisocyanate (NDI), positional isomers of diethylbenzene diisocyanates, as well as blends thereof.

Suitable aliphatic diisocyanates contain 2 to about 36 carbon atoms (excepting the carbon atom in the isocyanate groups), and include cyclic and non-cyclic aliphatic groups. Representative difunctional aliphatic polyisocyanates include, but are not limited to, ethylene diisocyanate, tetramethylene diisocyanate, isomers of cyclohexane diisocyanate including trans-cyclohexane-1,4-diisocyanate (CHDI), 4,4'-methylene-bis(cyclohexylisocyanate) (hydrogenated MDI), dodecamethylene diisocyanate, hexamethylene diisocyanate (HDI), dimeryl diisocyanate (DDI, formed by conversion of dimer acid to the diisocyanate), isophorone diisocyanate (IPDI), 2,2,4-trimethylhexamethylene-1,6-diisocyanate, meta and para isomers of tetramethylxylene diisocyanate (also known as benzene,1,3-bis(1-isocyanato-1-methylethyl)- or benzene,1,4-bis(1-isocyanate-1-methylethyl)and blends thereof.

The polyisocyanates may have more than two isocyanate groups present within the molecule. Polyisocyanates are commercially available from a variety of sources, and may be prepared by reacting an appropriate excess of the diisocyanate with a polyhydric compound. A representative example is the adduct of toluene diisocyanate and trimethylolpropane, which has an average of three isocyanate groups per adduct and is available from the Industrial Chemicals Division of Miles Inc., Pittsburgh, Pa. as Mondur CB (Registered Trademark). Polyisocyanates may also be prepared by taking advantage of the self-condensation reaction of the isocyanate group: three isocyanate groups will condense to form an isocyanurate ring. A polyfunctional aliphatic isocyanate, designated by Miles Inc. as Desmodur N-3300 consisting of a mixture of triisocyanate and higher analogs is prepared by condensing hexamethylene diisocyanate into the isocyanurate form. Another aliphatic triisocyanate, designated by Miles as Desmodur N-100, is formed through the biuret of hexamethylene diisocyanate. An isocyanurate copolymer of TDI and HDI having an average of about four isocyanate groups per molecule is available from Miles, Inc. of Pittsburgh, Pa. as Desmodur HL (Registered Trademark). Other polyisocyanates having more than two isocyanate groups per molecule include triphenylmethane-4,4',4"-triisocyanate, polymethylene polyphenylene polyisocyanates, and blends thereof. A commercially available polyisocyanate with a functionality between two and three consists of a trifunctional cycloadduct of 4,4'-MDI in equilibrium with the difunctional carbodiimide of 4,4'-MDI and unconverted 4,4'-MDI. This product is marketed by Dow Chemical Company under the tradename of Isonate 143L and similar products by ICI designated as XI-208 and LF-168 and as Rubinate XI-208 are also available.

Diactive Species Having Two Hydroxyl Groups

The polyfunctional species of the invention include diactive species. Among the diactive species according to the invention are diols, i.e., molecules having two hydroxyl groups. Suitable diols are aliphatic or aromatic dihydric compounds. Suitable diols have from 2 to about 300 carbon atoms, and the hydroxyl group may be primary, secondary, tertiary or phenolic. Tertiary and phenolic hydroxyl groups, however, generally react more slowly than primary and secondary hydroxyl groups, and give products having inferior properties and inferior stability with regard to heat and moisture.

Representative non-cyclic aliphatic diactive species having two hydroxyl groups include, but are not limited to, compounds such as ethylene glycol, 1,2-butanediol, 1,3-butanediol, 1,4-butanediol, 2,3-butanediol, 2-methyl-1,3-propanediol, 2,2-dimethyl-1, 3-propanediol, 2,2-dimethyl-1,3-propanediol, 1,2-pentanediol, 1,4-pentanediol, 1,5-pentanediol, 2,3-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, hexylene glycol, pinacol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, octamethylene glycol, 2,2,4-trimethyl-1,3-pentanediol, 2-butyl-2-ethyl-1,3-propanediol, 1,9-nonanediol, 1,2-decanediol, 1,10-decanediol, 1,2-dodecanediol, 1,12-dodecanediol, 1,2-tetradecanediol, 1,14-tetradecanediol, 1,2-hexadecanediol, 1,16-hexadecanediol, and mixtures thereof.

Another representative class of aliphatic dihydric compounds are the ether-diols, including, but are not limited to, diols prepared by the ring opening polymerization of alkylene oxides such as ethylene oxide and propylene oxide initiated by reaction with a dihydric compound. The polyether diols (also known as polyether glycols) from ethylene oxide and propylene oxide give hydroxy terminated compounds whose repeating inner structure consists of oxyethylene and oxypropylene groups, respectively. Polyether glycols prepared from tetrahydrofuran give repeating oxytetramethylene units. Ether-diols according to the invention may have number averages molecular weights ranging from about 150 to about 6,000. Suitable ether-diols according to the invention are commercially available from Dow Chemical Company as their Polyglycol (Registered Trademark) line of products, Union Carbide Corporation as their Carbowax (Registered Trademark) line of products, BASF/Wyandotte Corporation as their Pluracol (Registered Trademark) line of products and Olin Corporation as their Poly-G (Registered Trademark) line of products, QO Chemicals Inc., a subsidiary of Great Lakes Chemical Corp as their Polymeg line of products and Dupont as their Terathane line of products. The structures and properties of these trademarked materials have been described in detail in the parent company's literature.

Another class of dihydric and higher number of hydroxyl containing compounds are based on attachment of the active hydroxyl groups to polyester chains. The polyesters may be completely aliphatic or contain aromatic structures. (Generally polyesters are avoided in humid or aqueous environments because of their inferior hydrolytic stability)

Representative monocyclic aliphatic diactive compounds having two hydroxyl groups include, but are not limited to, cis- and trans-1,2-cyclopentanediol, cis- and trans-isomers of 1,3-cyclopentanediol, cis- and trans-1,2-cyclohexanediol, cis- and trans-1,3-cyclohexanediol, cis- and trans-1,4-cyclohexanediol, cis- and trans-1,2-cyclohexanedimethanol, cis- and trans-1,4-cyclohexanedimethanol, cis- and trans-1,2-cyclooctanediol, cis- and trans-1,4-cyclooctanediol, cis- and trans-1,5-cyclooctanediol, and mixtures thereof.

Representative polycyclic aliphatic diactive compounds having two hydroxyl groups include positional isomers of decalindiol including 1,5-decalindiol, pinene diol, and mixtures thereof. Representative aliphatic diols which contain an aromatic ring to which hydroxyalkyl groups are attached consist of 2,2'-(m-phenylenedioxy)diethanol (also known as resorcinol di(β-hydroxyethyl)ether or HER), 2,2'-(p-phenylenedioxy)diethanol(also known as hydroquinone di(β-hydroxyethyl)ether or HQEE) and phenyl diisopropanol amine.

Polyactive Species Having More Than Two Hydroxyl Groups

Representative noncyclic aliphatic polyactive compounds having more than two hydroxyl groups include, but are not limited to, glycerol, 1,1,1-tris(hydroxymethyl)ethane, 2-ethyl-2-(hydroxymethyl)-1,3-propanediol, (also known as trimethylol propane or TMP), pentaerythritol, dipentaerythritol, N,N,N',N'-tetrakis(2-hydroxypropyl)ethylene diamine (also known as Quadrol) and mixtures thereof.

Included among the class of noncylcic aliphatic polyactive compounds having more than two hydroxyl groups are polyether polyols. Such polyether polyols have a plurality of ether groups and three or more hydroxyl groups per molecule. Suitable polyether polyols are conveniently made by reaction of a polyhydric species having more than two hydroxyl groups with an alkylene oxide such as ethylene oxide or propylene oxide. The number average molecular weight of suitable polyether polyols ranges from about 220 to about 6,000 g/mol.

Another type of polyhydroxy species which is essentially a mixture of di and tri hydroxy compounds having a hydroxyl functionality typically of 2.2 to 2.6 consists of the hydroxy terminated polymers of polybutadiene. These are marketed by Atochem Inc. under the tradename of "poly bd".

Representative aromatic and alkylaromatic polyactive compounds having more than two hydroxyl groups include hydroxyhydroquinone, pyrogallol, 1,3,5-trihydroxybenzne, 2,6-bis(hydroxymethyl)-para-cresol, and mixtures thereof.

Diactive Species Having Two Amine Groups

The polyfunctional species of the invention include diactive species. Among the diactive species according to the invention are diamines, i.e., molecules having two amine groups. Suitable diamines may have aliphatic or aromatic substitution, and have from 2 to about 600 carbon atoms. Suitable diamines may be primary or secondary, where a primary amine has a single organic radical bonded to the nitrogen of —NH$_2$, and a secondary amine has two organic radicals, which may be the same or different from one another, bonded to the nitrogen of —NH.

Representative diamines having aliphatic substitution include, but are not limited to, ethylene diamine, 1,2-diaminopropane, 1,3-diaminopropane, 1,4-diaminobutane, 1,2-diamino-2-methylpropane, 1,5-diaminopentane, 2,2-dimethyl-1,3-propanediamine, 1,3-diaminopentane, 1,6-hexanediamine, 2-methyl-1,5-pentanediamine, 1,2-diaminocyclohexane, 1,4-diaminocyclohexane, 1,7-diaminoheptane, 1,8-diaminooctane, 2,5-dimethyl-2,5-hexanediamine, 1,9-diaminononae, 1,10-diaminodecane, 1,8-diamino-para-methane, isophoronediamine, 1,12-diaminododecane, and mixtures thereof.

Representative aromatic diamines include metaxylylenediamine, para-xylylenediamine, 1,8-diaminonaphthalene, 1,5-diaminonaphthalene, and other positional diaminonaphthaline isomers, 2,4-diaminomesitylene, and mixtures thereof.

Another representative class of diamines according to the invention comprises polyoxyalkylenediamines. Illustrative polyoxyalkylenediamines may be prepared by reaction of a dihydric alcohol initiator with ethylene and/or propylene oxide, followed by conversion of the hydroxyl groups to amine groups. Polyoxyalkylenediamines prepared in this manner are among the Jeffamine (Registered Trademark) products available from Texaco Chemical Company, Houston, Tex. The approximate molecular weight of these polyoxyalkylenediamines ranges from about 148 for Jeffamine EDR-148 to about 6,000 for Jeffamine ED-6000.

The extremely fast reaction rates between amines and isocyanates, especially with the aromatic isocyanates, generally precludes their usefulness because the working time required to adequately process the syntactic foam is too short. Exceptions to the excessively fast reaction rates, which many amines exhibit, are however found with certain high molecular weight aromatic diamines such as polytetramethyleneoxide-di-p-aminobenzoate which has an amine equivalent weight in the range of 600 to 640. This material, designated as Polamine 1000 or ODA-1000, is marketed by Air Products. Other similar oligomeric Polamines with nominal molecular weights ranging from about 650–2000 are also available and display suitable reaction rates with a number of aromatic diisocyanates.

Amines with electron withdrawing substituents on the aromatic ring or with substituents that provide steric hindrance in the area of the amino group will also react more slowly, thus permitting their use. The electron withdrawing carbonyl group in the para position of the Polamine 1000 in addition to the high molecular weight of the Polamine gives a useful reaction rate. A lower molecular weight version of Polamine 1000 is trimethylene glycol di-p-aminobenzoate which because of its carbonyl groups para to the amino groups has a useful reactivity. Another diamine which also exhibits favorable reactivity is methylene-bis(o-chloroaniline) in which the presence of the o-chloro groups provide reduced and thus manageable reactivity.

Polyactive Species Having More Than Two Amine Groups

There are numerous aliphatic and aromatic organic compounds according to the invention that contain more than two amine groups. Examples of aliphatic polyamines are diethylenetriamine, triethylenetriamine, triethylene tetraamine, tetraethylene pentamine and bishexamethylenetriamine. Examples of aromatic triamines are the mononuclear 1,3,5-triaminobenzene, and the trinuclear compound dodecahydro-1,4,7,9-b-tetrazaphenalene and the tetramine diphenylsulfone derivative, bis(3,4-diaminophenyl)sulfone. A series of polyether based triamines are made available by Texaco Chemical Co. under the designations of Jeffamine T-403, T-3000 and T-5000. The T-403 is based on the reaction of 5–6 moles of propylene oxide with one mole of trimethylolpropane followed by amination of the hydroxyl groups. It has an approximate molecular weight of 440. The T-3000 and T-5000 are based on adding approximately 50 and 85 moles respectively of propylene oxide to a mole of glycerine followed by amination. These compounds have molecular weights of approximately 3000 and 5000 respectively. These Jeffamines exhibit "moderate" reactivity, as compared to the very rapid reaction rate of most primary amines, because of the attachment of the amino group to a secondary carbon atom. This is attributed to steric hindrance by the pendant methyl group. Also, the rate of reaction tends to diminish with increasing molecular weights.

Diactive Species Having Both Amine and Hydroxyl Groups

The polyfunctional species of the invention include diactive species. Among the diactive species according to the invention are aminoalcohols, i.e., molecules having one hydroxyl and one amine group. Suitable aminoalcohols may comprise aliphatic or aromatic carbon moieties, and have from 2 to about 200 carbon atoms. Suitable amine groups are the primary or secondary amines. Suitable hydroxyl groups are aliphatic primary, secondary, tertiary or the aromatic phenolic, where primary hydroxyl groups are bonded to carbons with two hydrogens, secondary hydroxyl groups are bonded to carbons with 1 hydrogen, tertiary hydroxyl groups are bonded to carbons having no hydrogens, and phenolic hydroxyl groups are bonded directly to aromatic rings. Primary and secondary aliphatic hydroxyl groups are preferred over tertiary hydroxyl groups and over hydroxyl groups attached to an aromatic ring.

Representative diactive aminoalcohols include ethanolamine, 1-amino-2-propanol, 2-amino-1-propanol, 3-amino-1-propanol, 2-(methylamino)ethanol, 2-amino-1-butanol, 4-amino-1-butanol, 2-amino-2-methyl-1-propanol, 2-(ethylamino)ethanol, 5-amino-1-pentanol, 2(propylamino)ethanol, 2-amino-1-hexanol, 6-amino-1-hexanol, 2-(tert-butylamino)ethanol, and mixtures thereof.

Polyactive Species Having Both Amine and Hydroxyl Groups

Polyactive species having three or more reactive groups where a reactive groups consists of hydroxyl or amine groups, may be used in the synthesis of the polyurethanes of the invention.

Representative species having amine and hydroxyl functionality include N-hydroxyethyldiethylenetriamine, N,N'-bis(hydroxyethyl)diethylenetriamine, N-(2hydroxypropyl)ethylenediamine and diethanolamine.

The Hollow Microspheres

The foam compositions of the invention utilize hollow microspheres as the means to create voids within a polymer matrix. The preferred microspheres or beads have a shell that consists of polystyrene and a multicell hollow interior which contains air and/or residual blowing agent. The hollow microspheres may be prepared by any of a number of known processes, as described for instance in U.S. Pat. Nos. 4,303,729, 4,782,097, and 4,843,104. Suitable hollow microspheres can be prepared upon heating so as to cause expansion of the product of a dispersed two-phase polymerization of styrene monomer. The pre-expanded bulk density of the polystyrene was about 38 lb/ft$^3$ (609 kg/m$^3$). Upon heating, the polystyrene particles expanded to a bulk density of about 2 lb/ft$^3$ (32 kg/m$^3$). A typical size distribution for the expanded spheres is shown in Table 1. However, the size ranges of expanded spheres may range from average diameters of about 10 microns to about 2 millimeter. In our work we prefer expanded spheres having diameters in the range of 20 micrometers to 600 micrometers.

TABLE 1

| SIZE DISTRIBUTION FOR EXPANDED POLYSTYRENE | |
|---|---|
| Mesh Size* | Weight % |
| on 30 | 0 |
| on 35 | 5 |
| on 45 | 81–83 |
| on 50 | 10–12 |
| on 60 | 2 |
| >60 | 0 |

*U.S. Standard Sieves

The unexpanded polystyrene beads or microspheres containing the blowing agent appear on observation under an optical microscope to consist of transparent spherical solid particles. During their subsequent expansion resulting from a several second duration exposure to temperatures in the range of about 93° C. to about 107° C. the bulk density of the beads decreases from a range of about 600 kg/m$^3$–700 kg/m$^3$ to a range of about 12 kg/m$^3$–100 kg/m$^3$. In our work the preferred density range of the expanded beads is 16 kg/m$^3$ to 40 kg/m$^3$. Upon microscopic examination, the expanded beads are no longer clear but are opaque. This is in marked contrast to the clear transparent appearance of other types of expanded hollow polymeric microspheres, such as those based on copolymers of vinylidene chloride, which consist of a single gas filled hollow sphere or single cell without any internal structure. The polystyrene spheres, however, contain myriads of tiny hollow (gas filled) cells or bubbles which produce the opaque appearance. In a detailed study of the inner structure of the polystyrene spheres. See reference K. Hinselman and J. Stabenow: "Origin of the Cell Structure of Polystyrene Foam", Verein Deutscher Ingenieure-Ber, Nr.182, pp. 165–170, 1972) the inner cells are described as polyhedral hollow cavities. The polyhedral cavities are presumed to consist essentially of pentagonal dodecahedrons. Tiny bubble sources originally within the beads provide nucleation sites for the cells which are formed during the expansion process. The cells may number approximately 10,000 per mm$^3$ for beads with a density of about 20 kg/m$^3$. Since the above study shows that there is no additional nucleation during the expansion process, but merely conversion of the initially present nucleation sites to the expanded inner cells, we would expect that higher density beads would contain smaller cells and that the cell count per unit bead volume would increase in relation to the increase in density.

The weight average molecular weight range for the polystyrene that comprises the beads although it may range from about 40,000 to about 1,000,000, is typically 200,000 to 350,000 and more commonly 220,000 to 280,000.

Additives

While hollow microspheres with polystyrene shells and a polyurethane matrix are sufficient to form the syntactic foam of the invention, other materials may be added to the mixture of the foam ingredients prior to their gelation. Those additives may serve a variety of purposes, which include promoting the reactivity of the reactants or imparting desirable properties to the end product.

Catalysts may be added to the polyurethane components to increase the rate at which the urethane and/or urea linkages are formed, thereby increasing the rate of gelation of the foam. Suitable catalysts include iron(III)acetylacetonate, dibutyltin dilaurate, stannous octoate or 1,4-diazo-bicyclo[2,2,2]-octane. A preferred catalyst is dibutyltin dilaurate. A catalyst concentration of about 0.002 to about 0.5 weight percent based on the combined weights of polyisocyanate and polyfunctional reactants is typical. Use of catalysts depends upon the reactivity of the components. In cases such as with an isocyanate such as p-phenylene diisocyanate, which reacts very quickly, use of a catalyst could be undesirable.

Flame retardants may be added to the polyurethane matrix components prior to their reaction. Such materials impart fire resistance to the polyurethane foam. Flame retardants are well-known in the art and a wide variety of such materials may serve to impart fire resistance to the foams of the invention. A suitable fire retardant consists of a blend of isomeric pentabromodiphenyl oxides and tricresylphosphate in a weight ratio of about 2.9:1.0, respectively.

Process For Preparing the Syntactic Foams

The syntactic foams of the invention may be prepared by either a one-step or two-step reaction process for providing the matrix polymer.

The one-step process consists of mixing together all of the raw material ingredients without any prereaction. The polyisocyanate reacts with the polyfunctional active hydrogen compounds to form a polyurethane or polyurea polymer. The matrix polymer may also contain a combination of urethane and urea linkages. Depending on the specific process the additives may be premixed with each other and/or with the reactive components or added when the reactive components are being combined. Reactive components having the same type of reactive group, for example two different polyols, may be premixed prior to being brought into contact with the polyisocyanate. After the reactive components with the additives are brought together, the polymerization reaction commences and the liquid reactant mixture forms a solid polymer in which the hollow polymeric microspheres become embedded.

To prepare an elastomeric or semielastomeric single-step matrix polymer, typically a diisocyanate is reacted with an extender consisting of a combination of high and low molecular weight polyols. The high molecular weight polyols most often are diols consisting of a polyoxytetramethylene glycol (PTMG) or a polyoxypropylene glycol having a number average molecular weight in the range of about 650 to about 3000 or a hydroxy terminated polymer of butadiene having a molecular weight approximately in the range of 2000–3000 and a hydroxyl functionality slightly in excess of two. The low molecular weight polyols usually have molecular weights of less than 500. Typical low molecular weight diols are 1,4-butanediol and 2,2'-(p-phenlyenedioxy)diethanol. It is often desirable to include a small quantity of a trifunctional polyol such as tris(hydroxymethyl)ethane or tris(hydroxymethyl)propane in order to enhance the dimensional stability of the polymer by providing crosslinks. Polyamines may also be used as the extender system or may be used in combination with the polyols. However, care must be employed to select amines that will not react so rapidly as not to permit adequate time for processing. Generally for both amine and polyol systems the usual preferred stoichiometry consists of using from a 2% to a 10% excess of isocyanate groups. However, balanced stoichiometries are used in some cases where reactants with a functionality exceeding two are employed.

In summary, in the single-step process, the preparation of the prepolymer of the two-step process is omitted and all of the reactive active hydrogen compounds are combined essentially simultaneously with the polyisocyanate. Additives can be added to the individual reactive components prior to or during the final mixing step.

The two-step process consists of first preparing a polyurethane prepolymer by reacting an excess of a polyisocyanate, usually a diisocyanate, with a high molecular weight polyol, usually a diol (glycol). However, at times a combination of a diol and triol may be used. The ratio of isocyanate to hydroxyl groups in the prepolymer components can vary from about 1.5:1.0 to about 5.0:1.0; however, usually it is close to 2.0:1.0. All or a portion of the additives such as polymeric microvoids, flame retardants, pigments, etc. may be added to the prepolymer or their remaining portions may be added later-together with the chain extender. In the second step, the chain extender, which is a polyol or a polyamine or a mixture thereof, is mixed into the prepolymer. The chain extender can consist of relatively low molecular weight diols, a mixture of diols and triols, diamines, a mixture of diamines and triamines and combinations of components containing both amine and hydroxyl groups. The catalyst, if employed, may also be added to the prepolymer but preferably to the chain extender component. Either all or a portion of, the polystyrene spheres, all or a portion of the above described additives, and the chain extender component are added with agitation to the material in the mixing chamber. Mixing is continued, usually under a reduced absolute pressure of about 1 Torr to about 100 Torr but preferably at about 5–15 Torr for several minutes, typically for about 2 to 6 minutes. The mixture is then poured into a mold and cured.

Occasionally a relatively small quantity of a high molecular weight polyol or polyamine may be employed in the extender; however, this is not frequently the case since a high molecular weight polyol has already been employed in the prepolymer. Typically, the overall stoichiometry provides about a 5% excess of isocyanate groups over hydroxyl groups. However, the excess of isocyanate groups generally ranges from 0%, usually when a component has a functionality greater than 2, to about 10%.

The same active hydrogen components may be employed in both the one-step and two-step processes.

Use of a prepolymer (two-step process) provides the advantage of a lower exotherm which allows better process control and less thermal shrinkage. Because of the reaction in producing the prepolymer, there is also less polymerization shrinkage in the final foam preparation step. In some cases, the single and two-step processes which employ the same overall compositions, give slight to moderate differences in physical properties because of differences in the morphology of the chain structure. This results because the two-step process tends to give a more orderly sequencing of the polymer chain segments which decreases the inter mixing of the hard and soft domains. Thus a slightly higher modulus polymer may result from the two-step process.

The single-step process has the primary advantage of lower cost and more rapid processing due to the elimination of the synthesis of a prepolymer. In some cases, the single-step process permits or facilitates the mixing of certain additives because of the initially lower viscosity of the reactive solution as compared with the more viscous prepolymers.

In the preparation of the syntactic polyurethane foam one may employ either unexpanded microspheres, which are expanded during processing, or pre-expanded (already expanded) spheres. The former has the advantage of greater ease of incorporating the spheres into the matrix resin, and of providing a lower initial viscosity of the reactive mixture, whereas, the latter very importantly provides for more precise control of the ultimate density of the syntactic foam.

Utility and Properties of the Foams

The syntactic foams of the invention may be applied as coatings to various ships, vehicles, and stationary equipment where they offer many desirable characteristics. For example, they have a high microvoid content, commonly about 40 to 60% by volume, which provides a low density for the materials. Despite a high void content the materials exhibit compressive stiffness sufficient to limit their compressibility under the pressures experienced at the full submergence depths of submarines and other apparatus, thereby retaining their sound absorbing characteristics. When exposed to cycles of broad temperature and pressure ranges, they maintain their physical integrity and do not show loss of either cohesive or adhesive strength. The excellent cohesive and adhesive properties are maintained in the presence of pure water or water containing dissolved salts.

The resistance of the foams of the invention to environmental stresses is not obtained at the sacrifice of their sound absorbing qualities.

The foams demonstrate a low sensitivity of dynamic impedance to broad frequency ranges, which provides for maintenance of their high insertion loss characteristics. They have a ratio of dynamic impedance to static impedance of less than approximately two (2), at both high and low frequencies. They display a high lossiness over a broad frequency range without the occurrence of frequency notches. They show a velocity reduction of about 10 dB.

The acoustic properties of the foams of the invention make them useful as sound absorbing and decoupling agents. These materials are anechoic, i.e., they exhibit an unusually low level of reverberation, and they display relative insensitivity to wide changes in frequency. The compositions are particularly suitable for applications involving imparting anechoic and sound absorbing characteristics to the outer surfaces of structures or containers. Thus, this coating material was designed to both scatter and absorb incoming sound waves. This material can be used to coat various underwater vehicles and surface ships and land vehicles where it is undesirable that the vehicles or containers reflect sound waves or transmit sounds which either impinge upon or originate within the vessel or container into the surrounding medium.

A noteworthy feature of the foams of the invention is that they offer a wide latitude as far as means for applying the foams to ships or vehicles. Since the foams are prepared upon curing a fluid precursor mixture, the fluid mixture may be sprayed directly onto the substrate. Alternatively, the fluid precursor mixture may be poured into molds. After curing, the foam is released from the mold and the resulting tiles may be adhered to a substrate at a later convenient time. Another alternative, termed cast-in-place, utilizes relatively large molds in which one of the innerfaces of the mold is the substrate which is the hull of a ship or exterior body of a vehicle or a container. When employing the cast-in-place technique, the fluid foam-precursor mixture is poured into the mold, and after curing, the sides of the mold are removed leaving an essentially impervious foam which is very strongly adhered to the substrate. However, adjacent pours can utilize the outer edge of a previous pour as an edge surface of the mold. This process can be used directly in ship or vehicle manufacture.

The composition of the fluid foam-precursor mixture may be adjusted in order to take advantage of the various alternatives for constructing a foam-substrate laminate. For example, if the fluid foam-precursor mixture will be sprayed directly onto a preformed ship or vehicle surface, a short gel time is desirable in order to minimize sagging of the coating. The cast-in-place process is generally more efficaciously performed using a material composition that displays a relatively short gel time; however, a longer gel time than for spraying applications in order to allow adequate time for filling the mold. Shorter gel times are generally accomplished by increasing the concentration of the catalyst in the mixture, where typical suitable catalysts, but not limited to these, are dibutyltin dilaurate, stannous octoate or 1,4-diazo-bicyclo[2,2,2]-octane (DABCO), N-ethylmorpholine or iron(III) acetylacetonate. Relatively longer gel times can be tolerated when preparing foam tiles as opposed to using the cast-in-place technique. In the case of the cast-in-place process, gel times conveniently range from about 2 minutes to about 20 minutes at ambient temperatures between about 5° C. to 35° C. When foam tiles are being prepared, longer gel times are tolerated and elevated temperature processing may be employed since such tiles can be prepared in a factory and adhered with an adhesive to the substrate at a later date. Again, the gel and cure times may in part be controlled by adjusting the temperature of the material or the concentration or nature of the catalyst in the formulation.

The polystyrene microspheres contain polymer shells that were prepared from a monomer mixture consisting of at least 80 weight percent styrene monomer and preferably above 98 weight percent styrene monomer. The composition may intentionally contain up to about 2 percent of a divinyl monomer and more preferably up to about 0.5% of the divinyl monomer. Small quantities such as 0.5 weight percent of divinyl monomer will increase the dimensional stability of the spheres while not overly restricting their expansion. Examples of such dinvinyl monomers are divinyl benzene and ethylene dimethacrylate.

The polystyrene microspheres are preferably multicellular and may contain from about 100 to about 50,000 cells per cubic millimeter, more preferably from about 1,000 to about 20,000 cells per cubic millimeter.

The expanded polystyrene microspheres occupy a volume in the range of from about 30% to about 80% of the volume of foam, preferably 40% to about 60%. Also, the expanded polystyrene microspheres comprise from about 1.5% to about 10% of the total weight of the foam, preferably about 3% to about 6%.

In a one-step process the polystyrene microspheres, the polyols and other additives, if used, such as the catalyst, flame retardant, pigment, fillers, etc. may be premixed. Depending on the viscosity of the system, premixing may take place at temperatures ranging from about 25° C. to about 80° C. and usually at about 40°-70° C. The isocyanate component in the liquid state is then added to the above mixture with agitation, preferably under a reduced pressure of about 5–15 Torr so as to avoid stirring in air bubbles. The thoroughly mixed material is then poured into a mold for curing. In some cases the isocyanate component may be mixed into the mixture at ambient pressure with subsequent degassing being performed to remove air bubbles.

MEASUREMENT OF DYNAMIC MECHANICAL PROPERTIES

Figure 1:
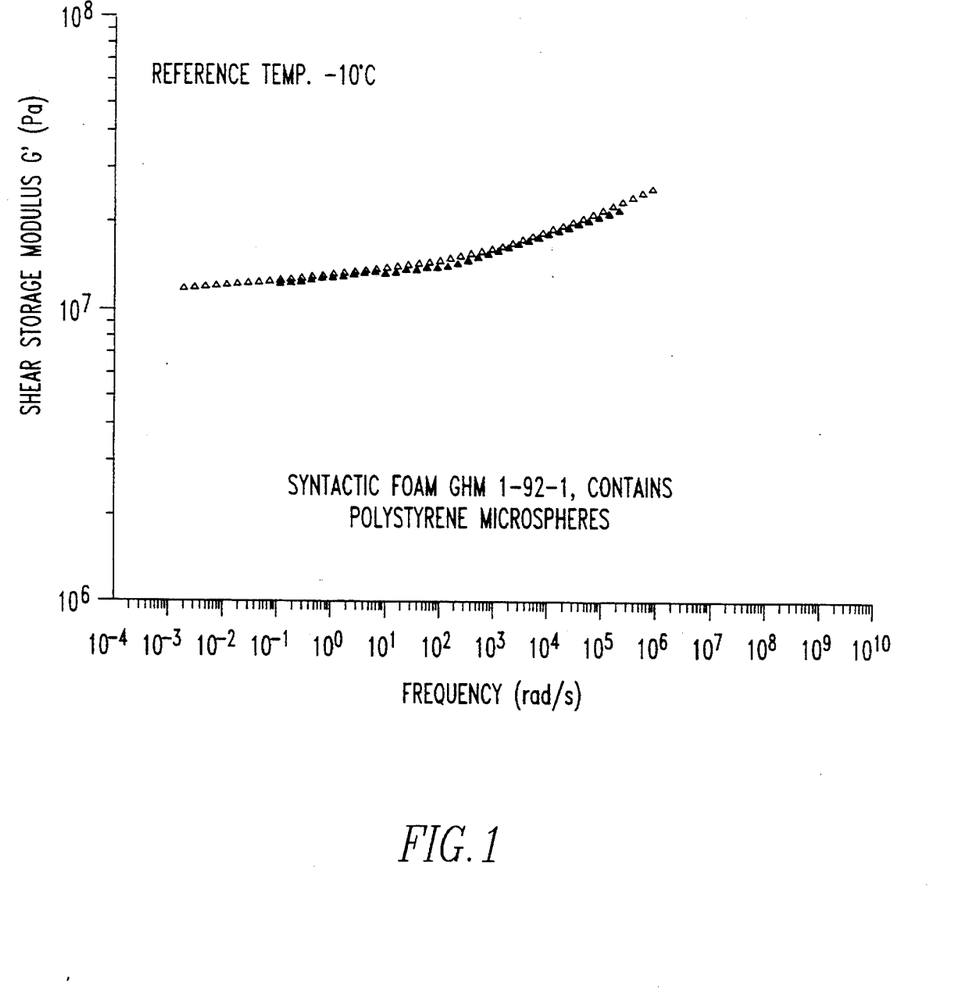
FIGS. 1 and 2 are graphs showing shear Storage Modulus vs Frequency for the materials described in Examples 1 and 2, respectively.
Figure 2:
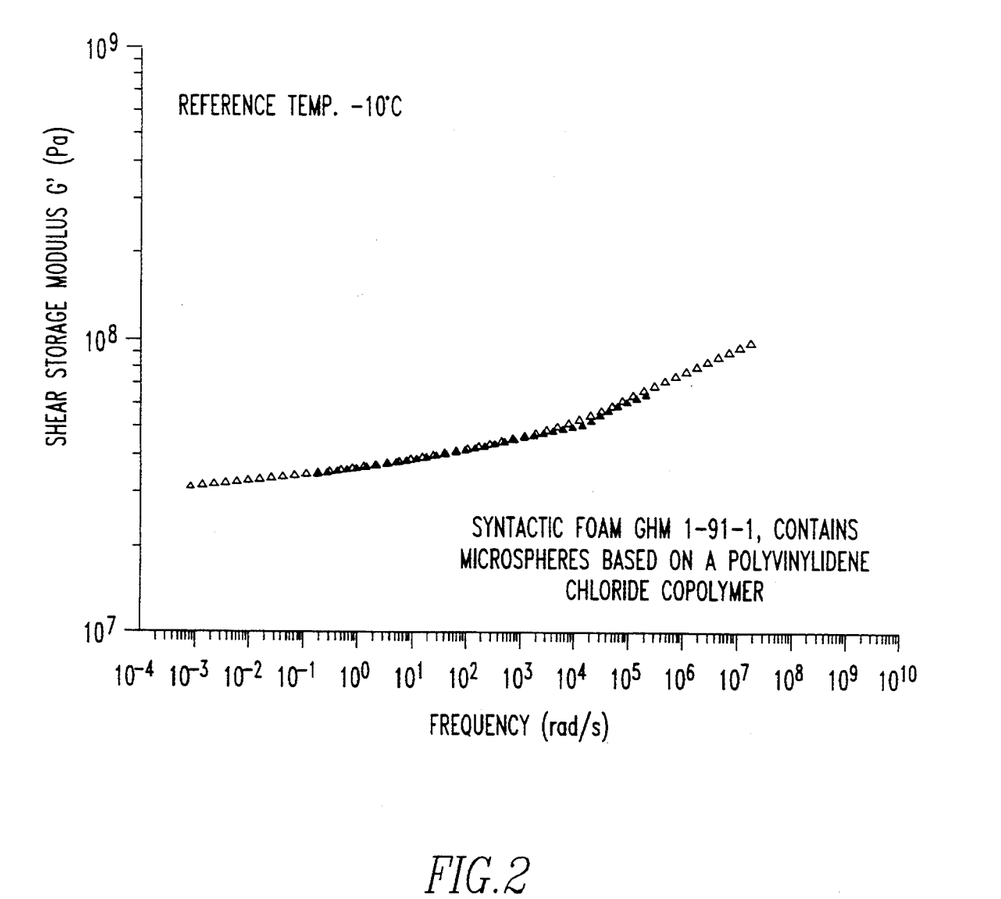

In a typical practice, measurements of the shear storage and loss moduli were performed using a Rheometrics Mechanical Spectrometer for the dynamic mechanical measurements. The measurements were conducted over a limited frequency range and over a broad range of temperatures in order to predict high frequency performance. This process is known as time temperature superposition (TTS) or the theory of reduced variables. TTS correlates short time behavior at a high temperature to the expected behavior at long times several decades removed from the test time and/or frequency. The basis for TTS is in the retardation and relaxation times which constitute the viscoelastic spectrum of the material being tested. At low temperatures, very little rearrangement of the molecules is possible within the period of deformation. This situation is also true for most high frequency measurements. This results in an essential equivalence of high frequency behavior with low temperature behavior. For example, an elastomer at a given temperature will tend to display a storage modulus which will increase with frequency and at a given frequency the modulus will increase with decreasing temperature. (In other words exposing a material to high frequency has an effect on mechanical properties that is similar to cooling the material). In both storage and loss moduli, insensitivity to frequency change is indicated by a relatively flat horizontal curve. As can be seen from FIGS. 1 and 2, the samples tested have good insensitivity to frequency change as indicated by the relatively low slopes of these curves.

Storage modulus insensitivity to frequency change is indicated by a relatively flat shear storage modulus, designated as G', which represents the portion of the stress returned to the system when the imposed strain is removed. Maximization of this component of the material response is important for storing energy that can be returned to the system on demand.

Shear loss modulus (G") is the component of the stress out of phase with the imposed dynamic strain by 90°. This test determines the viscous character of the material response. A portion of the input energy is dissipated as heat and molecular motion and is not returned to the system when the imposed strain is completely removed. Maximizing the composition relative to shear loss modulus is important for maximizing damping.

Relatively low slopes of the G" plots against frequency, although as expected higher than those of the G' plots, accompanied by low slope G' plots, indicate that damping, designated as tan δ (tan delta) and which is equal to the ratio of G" to G' (tan $\delta = G''/G'$), will also display a favorably low sensitivity to frequency.

SAMPLE FORMULATIONS

The following examples serve to further illustrate the present invention. The reactants and other specific ingredients are presented as being typical, and various modifications can be derived in view of the foregoing disclosure within the scope of the invention. The polystyrene spheres used in the following examples had the size distribution described in Table 1

EXAMPLES

Example 1

Preparation of Syntactic Foam Using Two-Step Process

A prepolymer was prepared in a reaction vessel containing a dry nitrogen atmosphere (−68° C. dew point) which was charged with 166 parts by weight (pbw) trans-1,4-cyclohexane diisocyanate (CHDI), 504 (pbw) polyoxytetramethylene diol (PTMG 1000) having a nominal number average molecular weight of approximately 1000 and a hydroxyl equivalent weight of 503.6, and 0.005 weight percent (based on the combined weights of the polyol and the diisocyanate) of dibutyltin dilaurate catalyst. In synthesizing the prepolymer, the diisocyanate and diol were employed in an isocyanate/hydroxyl equivalent ratio of 2.0:1.0 respectively. With stirring, the reactants were brought from 25° C. to 80° C. over a 40 minute period and then held between 80° C. and 96° C. for one hour, by which time the prepolymer had formed.

A flame retardant, which provided 10.8 percent of the weight of the final foam, and consisted of a mixture of isomeric pentabromodiphenyl oxides and tricresylphosphate in a weight ratio of 2.9:1.0, was stirred into the prepolymer. The mixture was permitted to cool to 60° C. and then poured into a Ross mixer. To the mixture was added a quantity of pre-expanded polystyrene microspheres equal to 3.8 weight percent of the final foam. This was followed by the addition of sufficient equivalents of chain extender to equal the equivalents of unreacted isocyanate present in the prepolymer (based on theory), where the chain extender consisted of a blend of trimethylol propane (TMP) and 1,4-butanediol (1,4-BD) in an equivalent ratio of 1.0:9.0, respectively. This mixture was mixed for 4 (four) minutes under an absolute pressure of about 10 Torr, and then transferred to a cylindrical and to a sheet mold for an overnight (ca. 16 hour) cure period at about 30° C., which provided the final syntactic foam. The foam had a density of 0.508 g/cm$^3$.

Example 2

Comparison Example Using Microspheres based on a Copolymer of Vinylidene Chloride and Acrylonitrile The procedure of Example 1 was repeated except that pre-expanded microspheres based on a copolymer of vinylidene chloride and acrylonitrile were substituted for the polystyrene based microspheres used previously. The resultant foam had a density of 0.616 g/cm$^3$.

The foams of Examples 1 and 2, when subjected to dynamic mechanical analysis, were characterized by their shear storage and loss modulus curves. Surprisingly, the polystyrene encapsulated voids of Example 1 afforded a foam having a reduced dependency on frequency.

Figure 3:
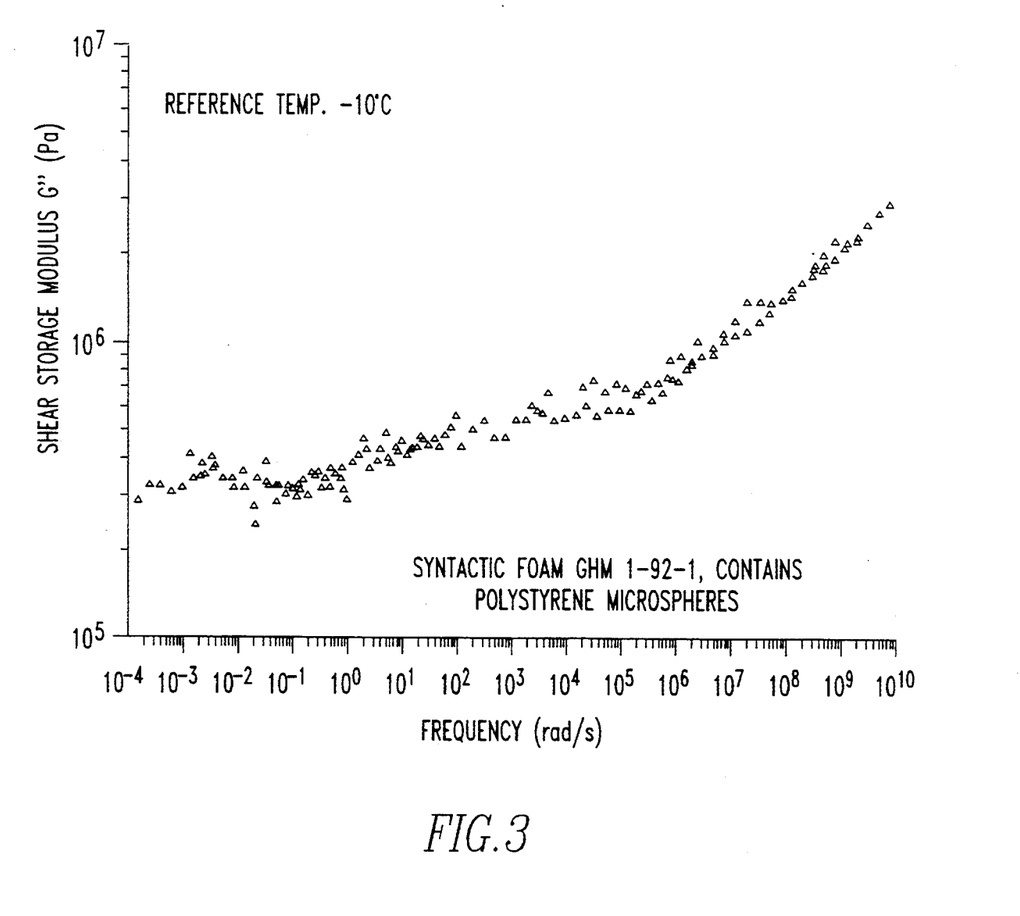
FIGS. 3 and 4 are graphs showing shear loss Modulus vs Frequency for the materials described in Examples 1 and 2, respectively.
Figure 4:
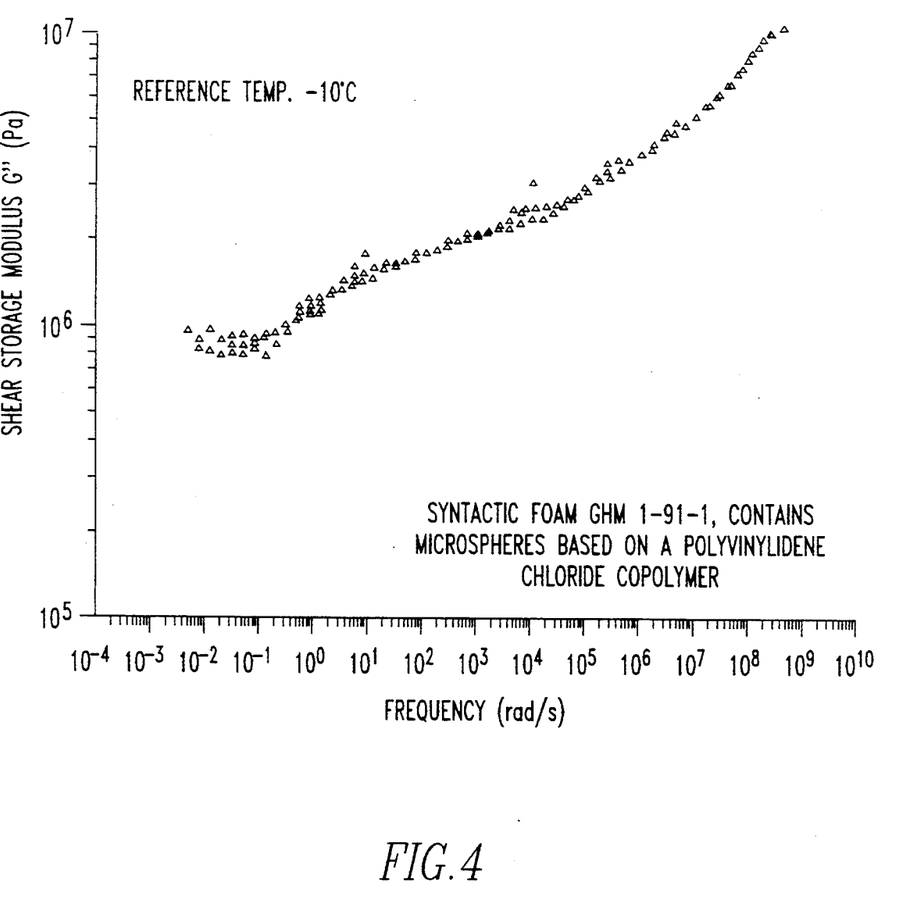

The material of Example 2, originally designated as GHM 1-91-1, displays excellent dynamic mechanical properties and thus its characteristics are used as a goal or target for mechanical properties over a very wide frequency range. The material of example 1, originally designated as GHM 1-92-1, which uses the multi-inner-cell polystyrene spheres in order to obtain advantageous acoustic properties, was found to also have the advantage of having excellent dynamic mechanical properties. The slopes of the storage moduli curves for GHM 1-91-1 and GHM 1-92-1, are essentially identical(see FIGS. 1 and 2). The shear loss moduli for the GHM 1-92-1 displayed even less sensitivity to frequency then that of GHM 1-91-1, as evidenced by the lower slope for GHM 1-92-1 (see FIGS. 3 and 4). The low sensitivity to frequency exhibited by GHM 1-92-1 would lead to a correspondingly broad frequency range of utility of this material. In other words, the sound absorption or deadening properties of the material, containing hollow polystyrene microspheres, would be satisfied for a broad range of excitating frequencies or sources.

Example 3

The syntactic foam of Example 1 may be prepared using the single step process which avoids the separate preparation of the prepolymer. A mixture of the following, in parts by weight (pbw), was prepared and brought to 65° C.

|  | Parts by Weight |
| --- | --- |
| PTMG 1000 | 504 |
| Dibutyltin dilaurate | 0.034 |
| Flame retardant | 90.5 |
| Expanded polystyrene spheres | 32.0 |
| Solution of 0.1 equivalents of TMP and 0.9 equivalent 1,4-BD | 45.0 | of TMP and 0.9 equivalent 1,4-BD The above mixture at 65° C. was stirred in a Ross mixer for about 2 minutes at a reduced pressure consisting of an absolute pressure of about 10 Torr. After repressurizing the mixing chamber, 166 pbw CHDI at about 65° C. was stirred into the mixture. Stirring continued for about 4 minutes at a reduced pressure of about 10 Torr absolute. The material was then transferred to the molds and cured overnight at about 50° C. The final material had an appearance that was indistinguishable from the material of Example 1

Example 4

A single step process was employed in preparing a syntactic foam. A polyisocyanate, designated as Isonate 143L by Dow Chemical (see description for composition of this isocyanate), and polytetramethyleneoxide-di-p-aminobenzoate, designated as Polamine-1000 or as ODA-1000 by Air Products and having a molecular weight of approximately 1238, were employed as the reactive components. An NCO:NH$_2$ equivalents ratio of 1.05:1.00, respectively, was employed. The overall formulation consists of, in parts by weight: 74.5 Polamine 1000, 1.0 carbon black, (designated as Elfrex 5 by Cabot Corp.), 5.0 expanded polystyrene microspheres, and 19.5 Isonate 143L.

The Polamine 1000, carbon black, and polystyrene spheres were premixed in a Ross mixer at about 60° C. under a pressure of about 5–10 Torr for about 5 minutes. After being returned to atmospheric pressure, the Isonate 143L was added and stirring continued at the reduced pressure of 5–10 Torr for about five additional minutes. The mixture was poured in a cylindrical mold and after about 30 minutes it gelled. The temperature of the cast material at the time of gelation was 59° C. After curing overnight at about 25°–30° C., the syntactic foam was demolded and displayed a density of 0.666 g/cm$^3$.

Example 5

A single step process was employed in preparing a syntactic foam. A polymethylene polyphenylisocyanate, designated by Dow Chemical as PAPI 94, having an average molecular weight of about 290, a functionality of about 2.3 and an isocyanate equivalent weight of about 131, and a nominal 2000 molecular weight polyoxytetramethylene glycol (PTMG-2000), having a hydroxyl equivalent weight of 991 and designated as Polymeg 2000 by its supplier QO Chemicals Inc., a subsidiary of Great Lakes Chemical Corp., and 1,4-butanediol were employed as the reactive components. In contrast to the other examples, unexpanded polystyrene spheres were employed. These spheres expanded during the subsequent temperature elevation of the reacting materials prior to gelation.

To a solution consisting of 991.2 pbw PTMG 2000 and 202.8 pbw 1,4-butanediol 112.9 pbw unexpanded polystyrene beads otherwise of the same type as previously employed was added with stirring at about 30° C. The mixture was degassed at about 5 Torr absolute pressure for about 22 minutes and then repressurized to atmospheric pressure. The PAPI 94, 721.6 pbw, was then stirred into this mixture for about 2 minutes at about 10 Torr pressure followed by pouring into a mold and a brief degassing. The mixture was then brought to 106° C. over the next 15 minutes as a result of gentle heating and the reaction exotherm during which time the beads expanded and the material gelled. As a result of the exothermic heat of the reaction the material subsequently reached a peak temperature of about 109° C. It was permitted to cool to room temperature and on demolding the next day the syntactic foam had a hardness of 90 Shore A/40 Shore D and a density of 0.585 g/cm$^3$.

Example 6

The composition of this syntactic foam is identical to the foam described in Example 5 except that preexpanded polystyrene spheres were used in place of the unexpanded microspheres. The reaction mixture reached 103° C. over about 10–15 minutes and was then permitted to cool to room temperature.

A semi-rigid syntactic foam having a density of about 0.46 g/cm³ resulted.

Example 7

A syntactic foam was prepared from the same composition as that described in Example 1 except that 486 pbw p-phenylene diisocyanate (PPDI) was used instead of 504 pbw CHDI in the synthesis of the prepolymer and no catalyst was employed. Because of the higher reactivity of the PPDI, the chain extender, consisting of the TMP/1,4-BD blend, was mixed into the prepolymer containing material for one minute instead of for four minutes. Processing conditions were otherwise identical. The final foam had a density of 0.55 g/cm³, and appeared essentially identical to that described in Example 1.

We claim:

1. A sound-absorbing syntactic foam comprising expanded polystyrene microspheres, dispersed randomly in a polyurethane matrix.

2. The foam according to claim 1, wherein the expanded polystyrene microspheres have a mean diameter in the range of from about 10 micrometers to about 2 millimeters.

3. The foam according to claim 1, wherein the expanded polystyrene microspheres have a mean diameter in the range of from about 20 micrometers to about 700 micrometers.

4. The foam according to claim 1, wherein the expanded polystyrene microspheres have a density in the range of from about 12 kg/m³ to about 100 kg/m³.

5. The foam according to claim 1, wherein the expanded polystyrene microspheres have a density in the range of from about 16 kg/m³ to about 40 kg/m³.

6. The foam according to claim 1, wherein the expanded polystyrene microspheres have an average molecular weight in the range of from about 40,000 to about 1,000,000.

7. The foam according to claim 1, wherein the expanded polystyrene microspheres have an average molecular weight in the range of from about 220,000 to about 280,000.

8. The foam according to claim 1, wherein the expanded polystyrene microspheres are multicellular.

9. The foam according to claim 8, wherein the multicellular expanded polystyrene microspheres contain from about 100 to about 50,000 cells per cubic millimeter.

10. The foam according to claim 8, wherein the unexpanded polystyrene microspheres are mixed with the unreacted components of the polyurethane matrix resin prior to the formation of the matrix polymer.

11. The foam according to claim 8, wherein the multicellular expanded polystyrene microspheres contain from about 1,000 to about 20,000 cells per cubic millimeter.

12. The foam according claim 8, wherein the expanded polystyrene microspheres occupy a volume in the range of from about 30% to about 80% of the volume of the foam.

13. The foam according to claim 8, wherein the expanded polystyrene microspheres occupy a volume in the range of from about 45% to about 60% of the volume of the foam.

14. The foam according to claim 8, wherein the expanded polystyrene microspheres comprise from about 1.5% to about 10% of the total weight of the foam.

15. The foam according to claim 8, wherein the expanded polystyrene microspheres comprise from about 3% to about 6% of the total weight of the foam.

16. The foam according to claim 8 in which the expandable polystyrene microspheres are initially added in their unexpanded form to its matrix resin components and are expanded on subsequent heating of the freshly mixed but not yet gelled material to temperatures above about 93° C. to give the low density multicellular microspheres.

17. The foam according to claim 8, wherein the polyurethane matrix is the structure resulting from the reaction of at least one polyisocyanate and at least one polyfunctional active hydrogen compound.

18. The foam according to claim 17, wherein the polyfunctional compound comprises only difunctional compounds selected from the group consisting of dihydric compounds, compounds containing two hydroxyl groups, diamino compounds, monoaminomonoalcohol compounds and mixtures thereof.

19. The foam according to claim 17, wherein the polyfunctional active hydrogen compound comprises a trifunctional compound selected from the group consisting of trihydric compounds, dihydricmonoamino compounds, monohydricdiamino compounds, triamino compounds and mixtures thereof.

20. The foam according to claim 17, wherein the polyfunctional active hydrogen compound comprises up to 50 equivalent percent of a tetrafunctional compound selected form the group consisting of tetrahydric compounds, trihydricmonoamino compounds, dihydricdiamino compounds, monohydrictriamino compounds, tetraamino compounds and mixtures thereof.

21. The foam according to claim 17, wherein the active hydrogen containing polyfunctional compounds are selected from the group consisting of 1,4-butanediol, trimethyol propane, hydroquinone di(B-hydroxyethyl)ether, polyoxytetramethylene diol having a molecular weight in the range of about 600 to about 3,000, and mixtures thereof.

22. The foam according to claim 17, wherein the polyisocyanate or polyfunctional isocyanate containing compound is selected form the group consisting of trans-1,4-cyclohexane diisocyanate, 1,6-hexane diisocyanate and its biuret and isoryanurate condensation products, 2,4-toluene diisocyanate; 2,6-toluene diisocyanate, 4,4'-methylene-bis(cyclohexyldiisocyanate), isophorone diisocyanate, 4,4'-methylene-bis(phenylisocyanate), condensation and oligomeric derivatives of 4,4'-methylene-bis(phenylisocyanate) including those that have functionalities greater than 2.0, p-phenylene diisocyanate, 2,4'-methylene-bis(phenylisocyanate), and oligomeric derivatives of 2,4'-methylene-bis(phenylisocyanate) including those that have functionalities greater than 2.0, and mixtures thereof.

23. The foam according to claim 17 wherein the polyfunctional active hydrogen compounds comprise a blend of difunctional and trifunctional active hydrogen containing compounds in an equivalents ratio of from about 95:5, respectively to about 60:40, respectively.

24. The foam according to claim 17 wherein the polyfunctional compounds comprise a blend of difunctional and trifunctional active hydrogen containing compounds in an equivalents ratio of from about 95:5 respectively to about 90:10 respectively.

25. The foam according to claim 17 wherein the equivalents ratio of polyisocyanate to polyfunctional active hydrogen containing compound is within the range of about 1.00:1.10, respectively to about 1.00:0.85, respectively.

26. The foam according to claim 17 wherein the equivalents ratio of the polyisocyanate to polyfunctional active hydrogen containing compounds is about 1.00:1.00 to 1.00:0.94, respectively.

27. The foam according to claim 1 further comprising a flame retardant.

28. The foam according to claim 8 further comprising a flame retardant.

29. The foam according to claim 17 further comprising a flame retardant.

30. A polyurethane syntactic foam prepared by a one-step process in which polystyrene microspheres or multicellular polystyrene microspheres are combined with at least one polyisocyanate compound and at least one polyfunctional active hydrogen containing compound in an equivalent isocyanate to hydroxyl ratio of about 1:1, the blend is generally heated and held at a temperature in the range of about 20° C. to about 100° C. for about 1 to 10 minutes under vacuum consisting of an absolute pressure of about 1 Torr to about 100 Torr.

31. The process of claim 30, wherein a catalyst is added to the reactants in a range of about 0.001 weight percent to about 0.3 weight percent.

32. The process of claim 31 in which the catalyst is diazobicyclooctane, dibutytin dilaurate, stannous octoate, iron(III) acetylacetonate, N-ethylmorpholine, a tertiary amine, a metal organic complex or an organometallic compound.

33. The process of claim 30 wherein at least one member selected from the group consisting of a flame retardant, a fire retardant or an intumescent compound is added to the starting materials.

34. The process of claim 33 in which the flame retardants are selected from the group consisting of isomeric pentabromodiphenyl oxides, tricresylphosphate and blends thereof.

35. A polyurethane syntactic foam prepared by a two-step process in which according to step 1, which consists of preparing the prepolymer, at least one polyisocyanate compound is combined with at least one polyfunctional hydroxyl containing compound in an equivalent ratio of about 1.5:1.0, respectively to about 5.0:1.0, respectively and the mixture heated to about 60° C. to about 100° C. for about 1 hour to about 4 hours to achieve an essentially complete reaction, and then in step 2 the prepolymer of step 1 is combined with polystyrene microspheres or multicellular polystyrene microspheres and sufficient equivalents of polyfunctional active hydrogen compounds to provide a composition substantially equally balanced in isocyanate and active hydrogen equivalents, and the mixture is stirred and heated under vacuum at about 25° C. to about 80° C. for about 1 to about 20 minutes and then poured into a mold to produce a cured composition.

36. The process of claim 35, in which the ratio of the polyisocyanate equivalents and the polyfunctional active hydrogen compound equivalents ranges from about 1.00:0.85, respectively to about 1.00:1.10, respectively.

37. The composition of claim 35 in which the polyfunctional active hydrogen compound of step 2 comprises a blend of difunctional and trifunctional compounds in an equivalents ratio of between about 95:5, respectively, and 80:20, respectively.

38. The process of claim 35 in which the polyfunctional active hydrogen compound of step 2 comprises a difunctional or a trifunctional compound or blend thereof.

39. The process of claim 38 in which said blend includes up to 20 equivalents percent of tetrafunctional compound.

40. A curable syntactic foam composition prepared by reacting and blending the admixture of:
(a) a prepolymer prepared by reacting trans-1,4-cyclohexane diisocyanate with a polyoxytetramethylene glycol having a number average molecular weight of about 1000 in the equivalents ratio of about 2.0:1.0, respectively, in the presence from 0 to about 0.3 weight percent of a catalyst
(b) and up to 30% of the weight of the final foam of a flame retardant
(c) about 1.5 weight percent to about 10% of the total weight of the foam of hollow preexpanded multicellular polystyrene microspheres, which have a bulk density ranging from about 12 kg/m$^3$ to about 100 kg/m$^3$, a mean diameter ranging from about 30 micrometers to about 700 micrometers, a weight average molecular weight polystyrene shell ranging from about 40,000 to about 1,000,000, and from 100 to 50,000 inner cells per cubic millimeter of sphere volume; and
(d) about 0.85 equivalents to about 1.05 equivalents of an extender per equivalent of the prepolymer described in part (a) above, the extender comprising of trimethylol propane and 1,4-butanediol in an equivalents ratio of about 1.0:9.0, respectively,
(e) and from 0 to 30% of the weight of the final form of an intumescent agent.

41. A composition according to claim 40 in which the fire retardant described in step (b) of claim 40 comprises a weight ratio of the pentabromodiphenyl oxides to tricresyl phosphate which ranges from 0:100, respectively to 100:0, respectively.

42. A composition according to claim 41 in which the trans-1,4-cyclohexane diisocyanate and the approximately 1000 molecular weight polyoxytetramethylene glycol are reacted in an equivalents ratio ranging from about 1.5:1.0, respectively to about 3.0:1.0, respectively.

43. A composition according to claim 40 except that in step (a) of claim 40 the molecular weight of the polyoxytetramethylene glycol used in preparing the prepolymer ranges from about 300 to about 6000.

44. A composition according to claim 40 except that in step (a) of claim 40 a polyoxypropylene polyol having a molecular weight ranging from about 300 to about 6000 is used in place of the polyoxytetramethylene glycol and reacted with the trans-1,4-cyclohexane diisocyanate in an equivalent ratio ranging from about 1.5:1.0, respectively to about 3.0:1.0, respectively.

45. A composition according to claim 40 except that the extender in step (d) of claim 40 consists of trimethylol propane and 1,4-butanediol in an equivalents ratio of about 0.5:9.5, respectively to about 5.0:5.0, respectively.

46. A composition according to of claim 43 in which an essentially chemically inert filler or pigment is added to the admixtures described therein in quantities up to about 50 weight percent of the foam.

47. A composition according to claim 43 except that instead of polyols the extender components consist either solely of polyamines, which may include one or more diamines, or a mixture of diamines and triamines, or of a mixture of at least one polyol and at least one polyamine.

48. A composition according to claim 46 except that instead of polyols the extender components consist either solely of polyamines, which may include one or more diamines, or a mixture of diamines and triamines, or of a mixture of at least one polyol and at least one polyamine.

49. A composition according to claim 46 in which a fire retardant is employed which comprises a mixture of isomeric pentabromodiphenyl oxides and tricresyl phosphate in a weight ration of about 2,9:1.00, respectively.

50. A composition according to claim 40 except that the prepolymer in step (a) of claim 40 is prepared by using p-phenylene diisocyanate instead of the trans-1,4-cyclohexane diisocyanate.

51. A composition according to claim 50 in which the p-phenylene diisocyanate and the approximately 1000 molecular weight polyoxytetramethylene glycol are reacted in an equivalents ratio ranging from about 1.5:1.0, respectively to about 3.0:1.0, respectively, in the preparation of the prepolymer.

52. A composition according to claim 50 in which the molecular weight of the polyoxytetramethylene glycol used in preparing the prepolymer has a molecular weight ranging from about 300 to about 6000.

53. A composition according to claim 51 except that a polyoxypropylene polyol is used in place of the polyoxytetramethylene glycol and reacted with the p-phenylene diisocyanate in an equivalents ratio ranging from about 1.5:1.0, respectively to about 3.0:1.0, respectively, in the preparation of the prepolymer.

54. A composition according to claim 50 in which the fire retardant comprised a weight ratio of pentabromodiphenyl oxides to tricresyl phosphate which ranges from 0:100, respectively to 100:0, respectively.

55. A composition according to claim 50 in which the extender consists of trimethylol propane and 1,4-butanediol in an equivalent ratio of about 0.5:9.5, respectively to about 5.0:5.0, respectively.

56. A composition according to claim 51 in which at least one of the extender components, comprising of trimethylol propane and 1,4-butanediol, are replaced by low molecular weight (<400) diols, triols, or above mixtures thereof.

57. A composition according to claim 50 in which at least one of the extender components, comprising of trimethylol propane and 1,4-butanediol, are replaced by low molecular weight (<400) diols and/or triols or mixtures thereof, such that the equivalents ratio of diols to triols can range from 0:1.00, respectively to 1.00:0, respectively.

58. A composition according to claim 46 except that the prepolymer is prepared using p-phenylene diisocyanate instead of trans-1,4-cyclohexane diisocyanate.

59. A composition according to claim 58 in which the fire retardant comprised a weight ratio of pentabromodiphenyl oxides to tricresyl phosphate which ranges from 0:100, respectively to 100:0, respectively.

60. A composition according to claim 50 in which the extender components consist of a diol or combination of diols.

61. A composition according to claim 50 except that instead of polyols the extender components consist of polyamines.

62. A composition according to claim 48 except that the prepolymer is prepared by using 4,4'-methylene-bis(phenylisocyanate) instead of the trans-1,4-cyclohexane diisocyanate and that its equivalents ratio of isocyanate to hydroxyl groups may range from 1.8:1, respectively, to 5:1, respectively.

63. A composition according to claim 40 except that the prepolymer described in step (a) of claim 40 is prepared by using 4,4'-methylene-bis(phenylisocyanate) instead of the trans-1,4-cyclohexane diisocyanate and that its equivalents ratio of isocyanate to hydroxyl groups may range from 1.8:1.0, respectively to 5:1, respectively.

64. A composition according to claim 41 except that the prepolymer is prepared by using 4,4'-methylene-bis(phenylIsocyanate) instead of the trans-1,4-cyclohexane diisocyanate and that its equivalents ratio of isocyanate to hydroxyl groups may range from 1.8:1.0, respectively to 5:1, respectively.

65. A composition according to claim 43 except that the prepolymer is prepared by using 4,4'-methylene-bis(phenylisocyanate) instead of the trans-1,4-cyclohexane diisocyanate and that its equivalents ratio of isocyanate to hydroxyl groups may range from 1.8:1.0, respectively to 5:1, respectively.

66. A composition according to claim 45 except that the prepolymer is prepared by using 4,4'-methylene-bis(phenylisocyanate) instead of the trans-1,4-cyclohexane diisocyanate and that its equivalents ratio of isocyanate to hydroxyl groups may range from 1.8:1.0, respectively to 5:1, respectively.

67. A composition according to claim 44 except that the prepolymer is prepared by using 4,4'-methylene-bis(phenylisocyanate) instead of the trans-1,4-cyclohexane diisocyanate and that its equivalents ratio of isocyanate to hydroxyl groups may range from 1.8:1.0, respectively to 5:1, respectively.

68. A composition according to claim 47 except that the prepolymer is prepared by using 4,4'-methylene-bis(phenylisocyanate) instead of the trans-1,4-cyclohexane diisocyanate and that its equivalents ratio of isocyanate to hydroxyl groups may range from 1.8:1.0, respectively to 5:1, respectively.

69. The composition according to claim 46 except that the prepolymer is prepared by using 4,4'-methylene bis(phenylisocyanate)instead of the trans-1,4-cyclohexane diisocyanate and that its equivalents ratio of isocyanate to hydroxyl groups may range from 1.8:1.0, respectively, to 5:1, respectively, and that the extender may consist of one or more of the following: diol, triol, diamine or of combinations thereof; and that the ratio of difunctional to trifunctional extender component can range from 0:1.00, respectively, to 1.00:0, respectively.

70. A composition according to claim 40 except that the prepolymer is prepared using either an oligomeric polyisocyanate having a functionality ranging from about 1.8 to 4.0 or using combinations of oligomeric polyisocyanates having functionalities ranging from about 1.8 to 4.0 or combinations of one or more of the above described oligomeric polyisocyanates with monomeric diisocyanates in place of the trans-1,4-cyclohexane diisocyanate used in step (a) claim 40 and that the equivalents ratio of isocyanate to hydroxyl groups in the prepolymer may range from about 1.8:1.0, respectively, to about 5.0:1.0, respectively.

71. A composition according to claim 40 except that the prepolymer described in step (a) of claim 40 is prepared using a polyisocyanate, which may be of aliphatic or aromatic origin and of a linear or branched or cyclic structure, or polyisocyanates which are oligomeric and have functionalities ranging from about 1.8 to 4.0 or combinations of above described polyisocyanates in place of the trans-1,4-cyclohexane diisocyanate used in step (a) claim 40, and that the equivalents ratio of isocyanate to hydroxyl groups of the prepolymer may range from about 1.8:1.0, respectively, to about 5.0:1.0, respectively.

72. A composition according to claim 41 except that the prepolymer is prepared using a polyisocyanate, which may be of aliphatic or aromatic origin and of a linear or branched or cyclic structure, or polyisocyanates which are oligomeric and have functionalities ranging from about 1.8 to 4.0 or combinations of above described polyisocyanates in place of the trans-1,4-cyclohexane diisocyanate used in step (a) claim 40, and that the equivalents ratio of isocyanate to hydroxyl groups of the prepolymer may range from about 1.8:1.0 respectively to about 5.0:1.0, respectively.

73. A composition according to claim 43 except that the prepolymer is prepared using a polyisocyanate, which may be of aliphatic or aromatic origin and of a linear or branched or cyclic structure or which may be oligomeric having a functionality ranging from about 1.8 to 4.0 or combinations of above described polyisocyanates in place of the trans-1,4-cyclohexane diisocyanate used in claim 40 step (a), and that the equivalents ratio of isocyanate to hydroxyl groups of the prepolymer may range from about 1.8:1.0, respectively to about 5.0:1.0, respectively.

74. A composition according to claim 44 except that the prepolymer is prepared using a polyisocyanate, which may be of aliphatic or aromatic origin and of a linear or branched or cyclic structure or which may be oligomeric having a functionality ranging from about 1.8 to 4.0 or combinations of above described polyisocyanates in place of the trans-1,4-cyclohexane diisocyanate used in claim 40 step (a), and that the equivalents ratio of isocyanate to hydroxyl groups of the prepolymer may range from about 1.8:1.0, respectively about 5.0:1.0, respectively.

75. A composition according to claim 45 except that the prepolymer is prepared using a polyisocyanate, which may be of aliphatic or aromatic origin and of a linear or branched or cyclic structure, or polyisocyanates which are oligomeric and have functionalities ranging from about 1.8 to 4.0 or combinations of above described polyisocyanates in place of the trans-1,4-cyclohexane diisocyanate used in claim 40 step (a), and that the equivalents ratio of isocyanate to hydroxyl groups of the prepolymer may range from about 1.8:1.0, respectively to about 5.0:1.0, respectively.

76. A composition according to claim 46 except that the prepolymer is prepared using a polyisocyanate, which may be of aliphatic or aromatic origin and of a linear or branched or cyclic structure, or polyisocyanates which are oligomers and have functionalities ranging from about 1.8 to 4.0 or combinations of above described polyisocyanates in place of the trans-1,4-cyclohexane diisocyanate used in step (a) claim 40, and that the equivalents ratio of isocyanate to hydroxyl groups of the prepolymer may range from about 1.8:1.0, respectively to about 5.0:1.0, respectively.

77. A composition according to claim 47 except that the prepolymer is prepared using a polyisocyanate, which may be of aliphatic or aromatic origin and of a linear or branched or cyclic structure, or polyisocyanates which are oligomeric and have functionalities ranging from about 1.8 to 4.0 or combinations of above described polyisocyanates in place of the trans-1,4-cyclohexane diisocyanate used in step (a) claim 40, and that the equivalents ratio of isocyanate to hydroxyl groups of the prepolymer may range from about 1.8:1.0, respectively, to about 5.0:1.0, respectively.

78. A composition according to claim 77 except that the extender may consist of one or more of, or combinations of the following; diol, triol or diamine.

79. A curable syntactic foam composition prepared by reacting a polyisocyanate, consisting of an equilibrium mixture of 4,4'-methylene-bis(-phenylisocyanate)(MDI), its difunctional carbodiimide and its trifunctional cycloadduct, which is a condensation product of MDI and its difunctional carbodimide, with an oligomeric diamine, polytetramethylene oxide-di-p-aminobenzoate, in which the ratio of isocyanate to amine groups ranges from about 1.15:1.00, respectively, to about 0.9:1.00, respectively, and to which is added by preblending with either or both of the reactive components or introduced just at the time the reactive components are brought together the multicellular expanded polystyrene microspheres in a range of about 2–15 weight percent of the foam.

80. A composition according to claim 79 wherein the hollow expanded polystyrene microspheres have a bulk density ranging from about 12 kg/m$^3$ to about 100 kg/cm$^3$, a mean diameter ranging from about 30 micrometers to about 700 micrometers, a shell having a weight average molecular weight of about 40,000 to 1,000,000 and from 100 to 50,000 inner cells per cubic millimeter of sphere volume.

81. The composition of claim 79 in which includes a flame retardant comprising from about 10% of the weight of the foam to about 35% of the weight of the foam.

82. The composition of claim 79 is in which includes a flame retardant comprising from zero to 35% of the weight of the foam, an intumescent agent comprising from zero to 25% of the weight of the foam and inert filler or pigment comprising from zero up to 25% of the weight of the foam.

* * * * *